United States Patent [19]

Birmingham

[11] Patent Number: 5,592,901
[45] Date of Patent: Jan. 14, 1997

[54] CAT SCRATCHING DEVICE FOR PROTECTING FURNITURE

[76] Inventor: Joan Birmingham, P.O. Box 3577, San Bernardino, Calif. 92413

[21] Appl. No.: 451,556

[22] Filed: May 26, 1995

Related U.S. Application Data

[63] Continuation-in-part of Ser. No. 48,830, Apr. 15, 1993, abandoned.

[51] Int. Cl.⁶ ............................................. A01K 29/00
[52] U.S. Cl. ..................... 119/706; D30/160; D8/403; 248/345.1; 297/463.1
[58] Field of Search ............................. 119/28.5, 83, 706; 150/158; 312/229; 248/345.1; D6/491; D8/402, 403; D30/158, 160; 24/292, 293, 294

[56] References Cited

U.S. PATENT DOCUMENTS

| | | | |
|---|---|---|---|
| D. 93,971 | 12/1934 | Clark | D8/402 |
| D. 232,105 | 7/1974 | Claassen | D30/158 |
| D. 238,792 | 2/1976 | White | D30/158 |
| D. 242,985 | 1/1977 | Sasgen | D8/402 |
| D. 336,033 | 6/1993 | Welsh | D8/403 |
| 2,005,817 | 6/1935 | Yoder . | |
| 2,148,091 | 2/1939 | Van Uum | 24/294 |
| 3,085,551 | 4/1963 | Helmer | 119/706 |
| 3,159,141 | 12/1964 | Paterek . | |
| 3,224,047 | 12/1965 | Horton | 24/293 |
| 3,936,025 | 2/1976 | Cass | 248/345.1 |
| 3,993,027 | 11/1976 | Mullin . | |
| 4,047,502 | 9/1977 | Gordon, Jr. . | |
| 4,539,936 | 9/1985 | Majewski . | |
| 4,611,556 | 9/1986 | Frank | 119/706 |
| 4,807,569 | 2/1989 | Leopold . | |
| 4,996,946 | 3/1991 | Olson | 119/706 |
| 5,038,716 | 8/1991 | Olson . | |
| 5,161,484 | 11/1992 | Duane | 119/28.5 |
| 5,347,690 | 9/1994 | Mansoor | 24/294 |

FOREIGN PATENT DOCUMENTS 34868  9/1981  European Pat. Off. .

OTHER PUBLICATIONS

"Sofa Savers", *Cats Magazine*, Jan. 1991, p. 35.

*Primary Examiner*—Todd E. Manahan
*Attorney, Agent, or Firm*—Fulwider Patton Lee & Utecht, LLP

[57] ABSTRACT

A cat scratching device for protecting furniture includes a protective frame which can be utilized by a cat as a scratching post and also protects at least a portion of a piece of furniture from the damaging effects of a cat's claws. The device includes a holding member attched to the protective frame for maintaining the the protective frame in a substantially upright position next to the piece of furniture. In one embodiment of the invention, this member can be designed as an outwardly extending foot which is placed between the floor and the leg of the furniture to hold the protective frame in place. In this manner, the weight of the piece of furniture helps maintain the device in place.

20 Claims, 2 Drawing Sheets

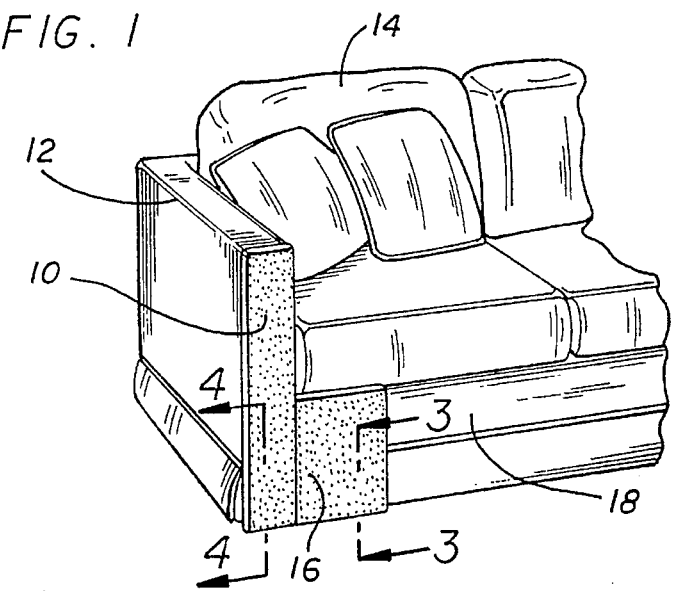
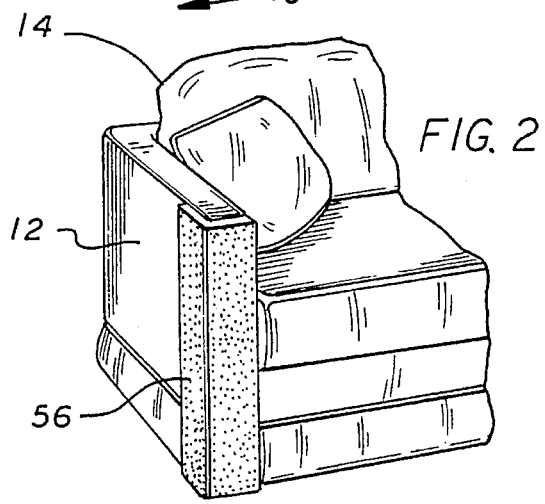
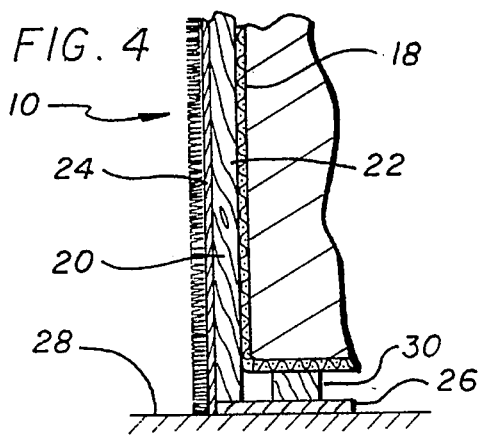
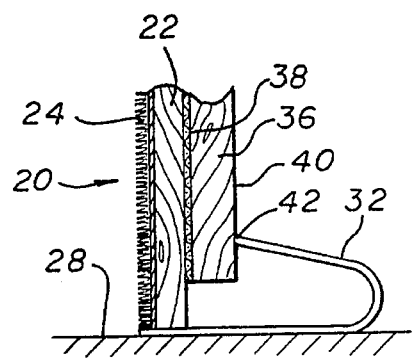
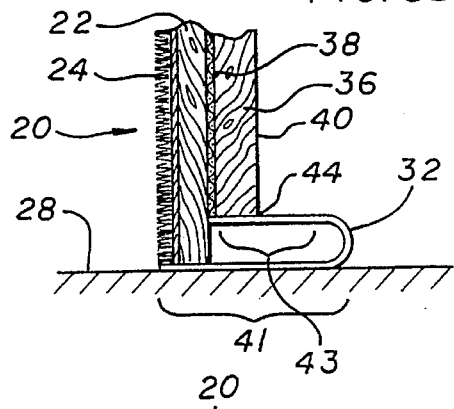
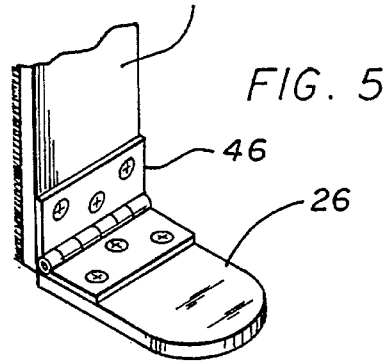
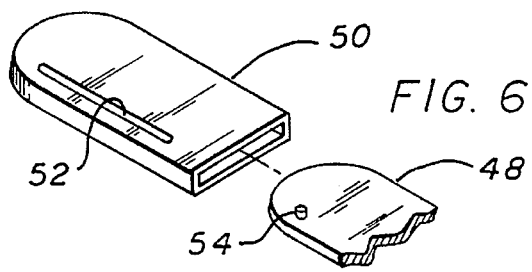

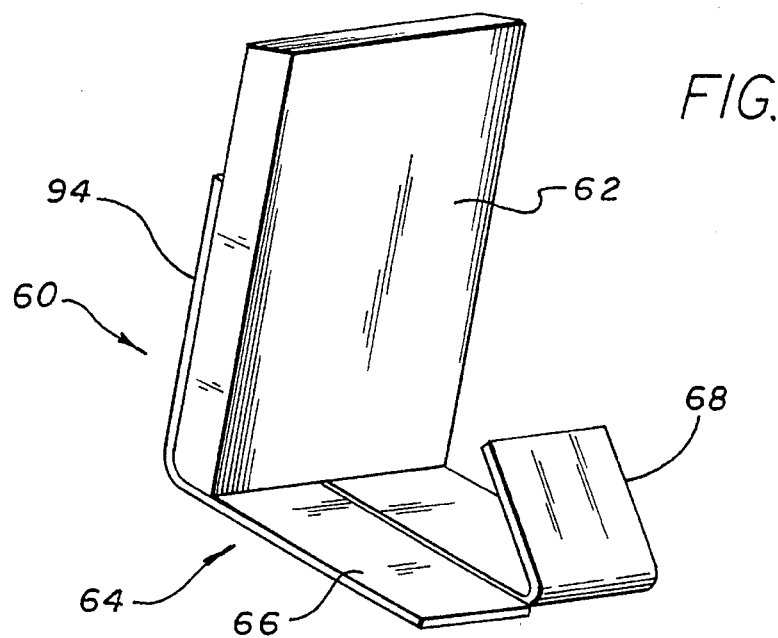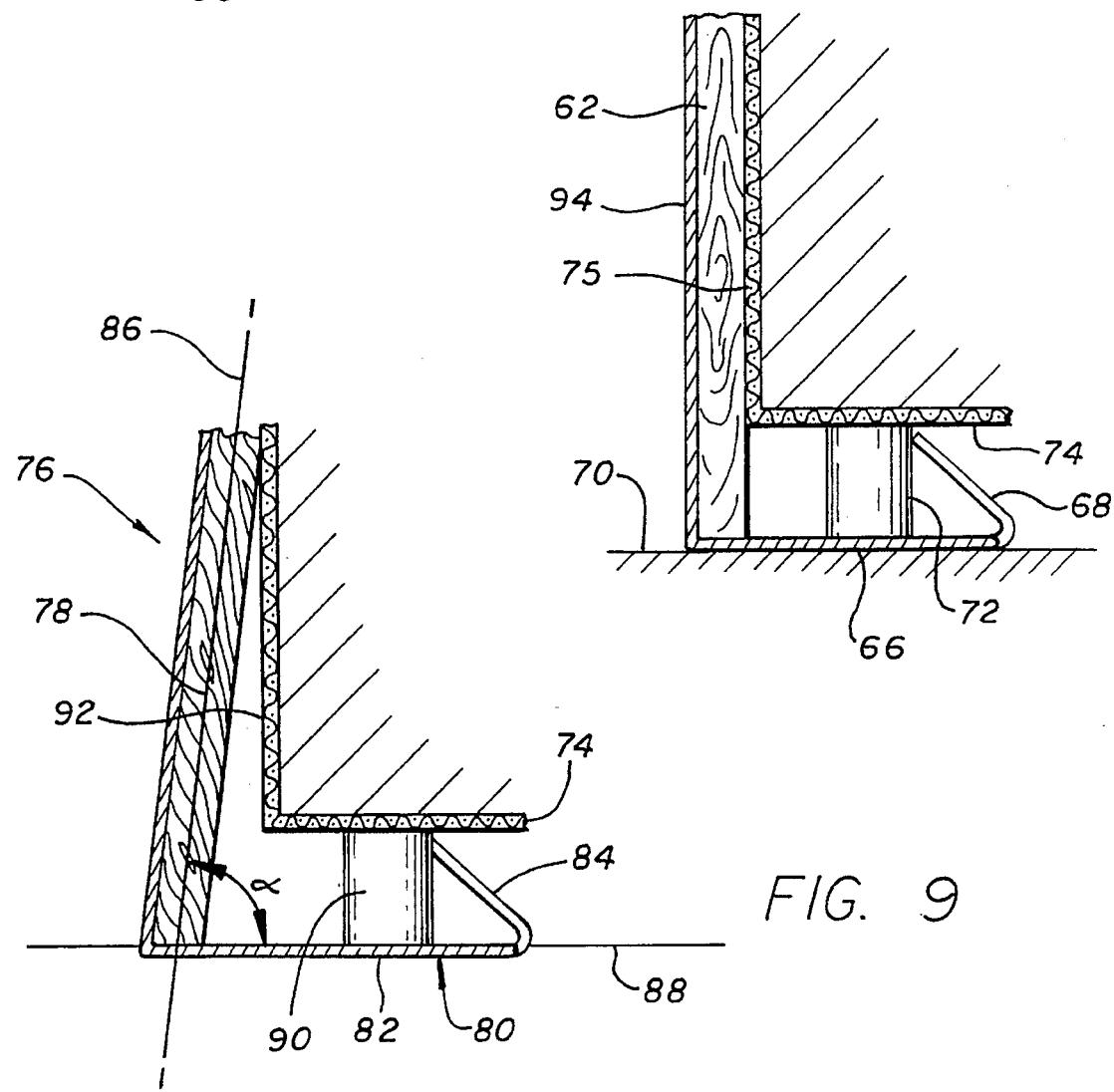

CAT SCRATCHING DEVICE FOR PROTECTING FURNITURE

This is a Continuation-In-Part of application Ser. No. 08/048,830, filed on Apr. 15, 1993, now abandoned.

BACKGROUND OF THE INVENTION

1. Field of the Invention

The present invention relates generally to devices commonly called "scratching posts" used by cats for scratching and stretching exercises, and more particularly, to a protective device which can be implemented with a piece of furniture to act as a scratching post that diverts cats and other domesticated animals from using the piece of furniture for scratching or stretching purposes, thus preventing possible damage to the furniture.

2. Description of Related Art

Various styles of scratching devices have been designed and implemented throughout the years for use by cats in scratching and stretching exercises. Most scratching devices consist of an upwardly extending post which has fabric, such as a piece of carpet or similar material, attached to it which the cat grasps with its front claws, allowing it to stretch its body. Such stretching exercises are usually a daily activity of most cats, especially if the cat remains within the home most of the day. Cats seem to particularly prefer scratching posts made from carpet or similar materials since it allows their claws to "dig" into the material for a firm grasp during the stretching exercise. Cats can also exercise their paws and claws by scratching and clawing at the scratching post. Scratching devices can be relative simple, such as a piece of carpet having a rope attached to it which allows the carpet to be hung from a doorknob, but can become useless if the cat does not adopt it for its stretching exercises.

One particular problem associated with a cat's daily stretching exercise is that cats will often use a piece of furniture as a scratching post which can result in quite extensive damage to the fabric of the furniture whenever the cat digs its claws into the fabric. Cats have been known to utilize furniture as scratching posts even though there are several conventional scratching posts available for the cat's use. Generally, once a cat starts using a piece of furniture as its scratching post, it is very difficult to stop the cat from using it since the scent of the cat has been imbedded in the piece of furniture and the cat will continue to use the furniture unless its scent is totally removed. Further and continuous use of the furniture as a scratching post will cause the fabric to fray and rip and can even cause the insulation or "stuffing" of the furniture to be exposed, which is both unsightly and costly to the pet owner. While an owner may be able to keep the cat off the furniture when he or she is at home, the cat can still continue to use the furniture as a scratching post when left alone in the home. As a result, considerable damage can be done on one or more pieces of furniture.

Therefore, there is a need for a device which can be used to protect a piece of furniture from being used as a scratching post by the cat, yet still allows the cat to perform its daily stretching activities. Such a device would be particularly beneficial if it can be implemented with a piece of furniture which the cat has already used as a scratching post since the cat will generally continue to use that particular piece of furniture again and again, causing costly damage. Also, the device should prevent damage to the piece of furniture yet should be easy to implement and remove.

SUMMARY OF THE INVENTION

In general terms, the present invention is directed to a novel device which can be implemented with a piece of furniture and used by a cat as a scratching post in place of the piece of furniture, thus protecting the furniture from the damaging effects of a cat's claws while still permitting the cat to perform its stretching exercises next to the furniture. The present invention can be quickly attached to, or removed from, a piece of furniture and will adequately protect it from further use as a scratching post. As a result, damage to expensive pieces of furniture can be curtailed or eliminated completely through the use of the present invention. The invention can be manufactured in a number of various sizes and shapes to protect different types and sizes of furniture.

More particularly, the present invention includes a protective frame which is substantial rigid and designed to cover at least a portion of the piece of furniture when placed in close proximity thereto. This protective frame serves both as a scratching post for the cat and a protective wall or layer which prevents the cat from clawing and scratching the piece of furniture. The device includes means for holding the protective frame in an upright position and in close proximity to the piece of furniture. In one particular form of the invention, the means for holding the protective frame includes an outwardly extending member or foot which can be placed between the floor and the leg of the furniture to maintain the protective frame in place. In this manner, the weight of the furniture helps hold the foot and protective frame firmly against the area of the furniture to be protected and maintains the protective frame in place when being grasped by the cat during its stretching exercises.

The present invention is particularly useful since it can be manufactured in a size and shape which will protect the particular area of the furniture which the cat has been utilizing as a scratching post. For example, if the cat has used the front arm of a couch as a scratching post, the present invention can be sized and shaped to fit directly in front of the arm of the couch to prevent further clawing by the cat. The cat can still smell its scent on the furniture, but will claw and scratch at the protective frame instead of the fabric of the couch. Since the cat will continue to use the particular piece of furniture for scratching purposes, the remaining furniture in the home should be left undamaged. If the cat has used several pieces of furniture for scratching purposes, multiple devices made in accordance with the present invention can be utilized with each of those pieces to prevent further damage.

In another embodiment of the present invention, the holding means can be made from a strip of resilient material which can be placed between the floor and a frame of the furniture to hold the protective frame in an upright position. Alternatively, the strip of material can be simply hooked up against the frame of the furniture to maintain the protective frame in its upright position.

In another embodiment of the present invention, the holding means is made from a composite device which includes an outwardly extending member or foot which can be placed between the floor and the leg of the furniture, along with a strip of resilient material which can be placed between the floor and the frame of the furniture to hold the protective frame in its upright position. This particular embodiment provides the user with the advantage of using either the outwardly extending foot and/or the strip resilient material to help hold the protective frame in place. This particular embodiment is advantageous since it gives the user the benefit of both types of holding means for maintaining the device in close proximity to the piece of furniture.

In another particular embodiment of the present invention, the holding means can include means such as a spring mechanism which will cause the outwardly extending foot to draw back against the protective frame to create a low profile unit that can be stored under the piece of furniture when not in use. When the user desires to attach the device to the furniture, he/she merely snaps the foot down perpendicular to the protective frame and installs it under the leg of the furniture. This feature is particularly advantageous since the device can be stored directly beneath the furniture, out of sight, until the user decides to utilize it. The particular holding means is also advantageous since it allows for quick and easy assembly and removal.

In another particular form of the invention, the means for holding the protective frame includes an outwardly extending foot which is connected to the frame such that the foot meets with the protective frame at an angle less than 90 degrees. Once the outwardly extending foot is placed between the floor and the leg of the furniture, the weight of the furniture helps hold the foot in place while maintaining the protective frame firmly in place against the area of the furniture to be protected when being used by the pet during its stretching exercises. Additionally, since the outwardly extending foot and protective frame are connected at an angle less than 90 degrees in this particular embodiment, the device creates a "snap-back" mechanism which generates a biasing force which helps maintain the protective frame in its abutting position against the piece of furniture.

The features and advantages of the present invention will become more apparent from the following detailed description of the embodiments, taken in conjunction with the accompanying drawings, which illustrate, by way of example, the principles of the present invention.

BRIEF DESCRIPTION OF THE DRAWINGS

FIG. 1 is a partial perspective view of two particular embodiments of the present invention positioned on a sofa;

FIG. 2 is another particular embodiment of a device made in accordance with the present invention;

FIG. 3A is a partial cross sectional side view of the second embodiment shown in FIG. 1 taken along line 3—3;

FIG. 3B is a partial cross sectional side view of the second embodiment of FIG. 1 taken along line 3—3 which shows an alternative method for hooking the second embodiment to the sofa;

FIG. 4 is a partial cross-sectional side view of the first embodiment shown in FIG. 1 taken along line 4—4;

FIG. 5 is another particular embodiment of a device made in accordance with the present invention;

FIG. 6 is a partial perspective view of one particular embodiment of a foot extension made in accordance with the present invention;

FIG. 7 is a prospective view of another particular embodiment of a device made in accordance with the present invention;

FIG. 8 is a partial cross-sectional side view of the embodiment shown in FIG. 7 as it is positioned to a piece of furniture; and FIG. 9 is a partial cross-sectional side view of another particular embodiment of a device made in accordance with the present invention as it is positioned to a piece of furniture.

DETAILED DESCRIPTION OF THE PREFERRED EMBODIMENTS

Referring now to the drawings, and particularly to FIG. 1, there is shown two particular embodiments of a cat scratching device for protecting furniture made in accordance with the present invention. The first embodiment of the protective device 10 is shown as it is affixed in front of an arm 12 of a couch 14. The second embodiment of the protective device 16 is shown as it is affixed against a front panel 18 of the couch 14 which is located directly below a cushion of the couch. This particular front panel 18 is generally made from a horizontal frame which extends along the length of the couch and which can also be used for scratching purposes by a cat. The first protective device 10 is shown affixed to the front face of the arm 12 which is an area of a couch that is very open used as a scratching post by a cat. As can be seen in FIG. 1, the particular sizes and shapes of the first and second protective devices 10 and 16 vary in order to protect the particular area of concern on the couch. The size and shape of the device can of course vary depending upon the particular shape of the area to be protected and the particular piece of furniture to be protected. It should be appreciated that the protective device can be manufactured in a number of shapes and sizes for any given piece of furniture without departing from the spirit and scope of the present invention.

Referring now to FIG. 4, the construction of the first protective device 10 is shown in greater detail. The protective device 10 includes a protective frame 20 which extends along the length of the arm of the couch to protect it from further damage by the cat (also see FIG. 1). The protective frame 20 shown in FIGS. 1 and 4 is made from a substantially rectangular shape piece of wood 22 which has an outer covering 24 which is made from carpeting or other similar material. This particular form of the protective frame is just one of many embodiments which can be utilized in connection with the present invention. It of course should be appreciated that other materials such as plastics, metals and the like could also be used to create the protective frame 20. In fact, a solid piece of wood or other material is not necessarily needed in order to create the protective frame 20 if, for example, a suitably strong carpeting or similar material having sufficient rigidity could be implemented. Also, it should be appreciated that it is not necessary to utilize carpeting in connection with the protective frame 20 if the material to be used as the protective frame provide a surface which allows the cat to dig its claws therein and also protect the piece of furniture. Accordingly, the thickness of the protective frame 20 can vary depending upon the type of materials that are used to create it.

Referring again to FIG. 4, the protective frame 20 includes holding means, such as an outwardly extending member or foot 26 which is utilized to maintain the protective frame in a substantially upright position against the piece of furniture. This outwardly extending foot 26 is shown as it is placed between the floor 28 and one of the legs 30 of the couch 14. This outwardly extending foot 26 can also be implemented in various shapes and sizes to accommodate the particular piece of furniture which it is designed to protect. Also, any suitable means for attaching the foot 26 to the protective frame 20 can be utilized. In one particular form of the invention, the outwardly extending foot 26 and protective frame 20 could be made from a single piece of material without departing from the spirit and scope of the present invention. In use, it would be beneficial to utilize an outwardly extending foot which has sufficient width to receive the leg of the furniture it is to protect. Thus, the weight of the piece of furniture, in this instance, the couch, helps maintain the protective frame in its substantially upright position next to the couch. The device remains in place even as the cat grasps the face of the protective frame with its claws during the stretching exercises and attempts to pull it away from the piece of furniture.

Referring now to FIGS. 3A and 3B, the second protective device 16 is shown as it is affixed to the couch 14. Referring first to FIG. 3A, the protective frame 20 is again made from a substantially square piece of wood 22 along with a piece of material such as carpeting 24 which is attached thereto. The holding means shown in this particular embodiment consists of a strip of resilient material 32 which extends from the bottom end 34 of the protective frame 20 as is shown in FIG. 3A. This particular strip of resilient material 32 is fastened to the protective frame 20 to allow it to be maintained in a substantially upright position next to the front panel 18 of the couch. As can be seen in FIG. 3A, the strip of resilient material 32 extends behind the front panel 18, which consists of a piece of wood 36 with fabric 38, and hooks up against the back portion 40 of the panel 18. The strip 32 has an end 42 which contacts the back portion 10 of the panel to help maintain the protective frame 20 upright and against the front panel. During usage, the user may be required to bend the resilient strip back somewhat to enable it to contact the back portion of the panel to maintain the device in its upright position. It should also be appreciate this particular strip 32 is just one particular form of a holding means that it can be implemented in order to maintain the protective frame in contact with the couch. The strip 32 can be made out of a number of suitable materials such as metals, such as aluminum, plastic or other resilient materials which, provides the desired function.

Referring now to FIG. 3B, the same strip of material 32 is shown as it is held against the front panel 18 of the couch in an alternative fashion. As can be seen in FIG. 3B, the strip 32 does not extend to contacts the back portion of the front panel, but rather, has a first side portion 41 which contacts the floor 28 and a second side portion 43 which comes in contact with the bottom edge 44 of the front panel in order to maintain the protective frame in place. The resiliency of the material as it is placed between the floor and front panel acts as a "spring" which helps maintain the device in place until it is ready to be removed. Removal is quite easy since the device only has to be pulled straight back from the couch to disengage it. In FIG. 3A, since the end of the strip contacts the back side of the front panel, the couch may have to be lifted somewhat by the user in order to clear the device from the front panel of the couch. The method of implementing the strip 32 depicted in FIG. 3B may thus eliminate the need to raise or lift the couch when removing the device.

Referring now to FIG. 7, another embodiment of a protective device 60 which includes a protective frame 62 and holding means 64 is shown. This holding means includes an outwardly extending member or foot 66 which is utilized to maintain the protective frame 62 in a substantially upright position against the piece of furniture. The particular holding means 64 shown in FIG. 7 also includes a resilient outwardly extending member 68 which could be made from a strip of resilient material 68 which extends outwardly away from the protective frame and forms a "U" or "V" shape which allows the strip 68 to contact a bottom panel of the furniture to help maintain the protective frame 62 in its upright position. In essence, this particular holding means 64 utilizes the concept of the outwardly extending leg shown in FIG. 4 combined with the strip of resilient material as is shown in FIGS. 3A and 3B. This particular composite holding means 64 allows the user to place the device 60 either at the location at the piece of furniture where the member or foot 66 can be placed between the floor and the leg of the furniture or, alternatively, where there is no leg of the furniture to help hold the unit in place. At this later location, the strip of resilient material 68 would be utilized to maintain the unit in place in a manner similar to the embodiment shown in FIGS. 3A and 3B.

In FIG. 8, this outwardly extending member or foot 66 is shown as is placed between the floor 70 and one of the legs 72 of the piece of furniture. It should be appreciated that this outwardly extending member or foot 66 can also be implemented in various shapes and sizes to accommodate the particular piece of furniture which it is designed to protect. As is shown in FIG. 8, the second resilient outwardly extending member 68 made from a strip of resilient material 68 also helps to maintain the protective frame in its upright position since the top portion of the strip comes in control with a bottom panel 74 of the furniture.

Referring now to FIG. 9, another embodiment of the present invention is shown in which the protective device 76 includes the protective frame 78 and a holding means 80, which is similar to the combustion holding means shown in FIG. 7. In this particular embodiment, the protective frame 78 is attached to the holding means 80 such that two elements meet at an angle less than 90 degrees. Center lines 86 and 88 show that the planes of the protective frame and outwardly extending leg 62 define an angle α which is less than 90 degrees. Generally, this angle α ranges from less than 90 degrees to about 60 degrees. By maintaining this particular angulation between the holding means and protective frame, a "snap-back" mechanism is created on which the upper portion of the protective frame abuts against the front panel 92 of the piece of furniture. The resiliency of the material which is used for the protective frame and the outwardly extending member or foot creates a small biasing force which helps maintain the protective frame firmly in place against the device until it is ready to be moved. As a result, the protective device 76 should remain snugly in place.

It should be appreciated that the protective frame and the outwardly extending member or foot could be maintained at this angle α (less than 90 degrees) on the other embodiments shown in FIGS. 4 and 5. Additionally, the particular holding means shown in FIG. 7 includes an upwardly extending portion 94 which is attached to the protective frame 62. This upwardly extending portion 94 of the holding means 64 can be either fastened to the protective frame 62 by an adhesive or other fastening devices such as screws, bolts, etc. This particular embodiment shown in FIG. 7 shows just one of the many ways in which the holding means can be attached to the protective frame.

FIG. 5 shows a particular embodiment of the present invention in which the protective frame 20 is attached to the holding means or outwardly projecting foot member 26 via a springed hinge 46. This springed hinge 46 allows the foot 26 to snap back against the protective frame 20 when the device is not in use. As a result, the outwardly projecting foot will not extend outwards when not in use thus creating a much thinner profile which allows the device to be stored underneath the piece of furniture when not in use. The hinge 46 does not necessarily have to be spring loaded, but rather, can be an ordinary hinge which allows the user to simple flip the foot up manually for storage.

Referring now to FIG. 6, a particular embodiment of the outwardly extending foot 48 is shown which includes an extension portion 50. This extension portion 50 allows the device to be implemented with furniture that may have legs that are in a more recessed position than is shown in FIG. 4, i.e., the legs are set inward away from the front side of the furniture. This extension portion 50 is designed to increase the length of the outwardly extending foot if needed for a particular piece of furniture. Referring specifically to FIG. 6, the extension portion 50 is designed to ride over the main foot 48 during use and can be slided to its outward position if desired. The extension portion 50 includes a slot 52 which is designed to slide along a pin 54 on the main foot portion 48 to prevent the extension portion 50 from disengaging and also to permit it to move back and forth to the extended position. As a result, the length of the foot can be easily increased to reach the legs of a couch or other piece of furniture.

Referring now to FIG. 2, an alternative embodiment of the present invention is shown which is designed to protect the front and side portions of the arm 12 of the couch 14. In this particular embodiment of the invention, two protective devices, such as the one shown in FIGS. 1 and 4, can be joined together to form the angled composite protective 56 device shown in FIG. 2 or, alternatively, a single piece can be manufactured to create the device shown. In the particular form of the invention shown in FIG. 2, an outwardly projecting foot, (not shown) or similar holding device would be used to maintain the angle shaped protective device in its upright position. This particular form of the invention shows how that various shapes and forms of the present invention can be achieved without departing from the spirit and scope of the present invention. Other forms of the present invention will become evident in light of the embodiments described and shown herein.

It should be appreciated that the present invention can also be utilized with new furniture to prevent the cat from utilizing portions of the furniture as a scratching post. In this manner, if the cat adopts the device as a scratching post before any damage can be done to the piece of furniture, the chances of the cat utilizing other pieces of furniture can be minimized. The present invention could thus include a packet of catnip or similar material which may attract the cat to use the device for its scratching post, rather than pieces of furniture. It would be easy to modify the existing device to include an envelope or similar containing means in the protective frame to allow the user to place catnip therein to help attract the cat to the device.

Although the present invention has been described in detail with reference to the presently depicted embodiments, it should be understood by those in ordinary skill in the art that various modifications can be made without departing from the present invention. Accordingly, it is not intended that the invention be limited except by the following claims.

What is claimed is:

1. A scratching device for protecting a piece of furniture from being scratched by a pet, comprising:

a substantially rigid protective frame for covering at least a portion of the piece of furniture when placed in close proximity thereto, wherein said protective frame includes a surface into which a pet may sink its claws; and an outwardly extending member connected to said protective frame for holding said protective frame in a substantially upright fashion and in close proximity to the piece of furniture, said outwardly extending member extending at an angle less than 90 degrees relative to said protective frame, wherein said member maintains the protective frame in a substantially upright position and the angulation of said member and said protective frame creates a biasing force which maintains said protective frame abutted against the piece of furniture when said member is placed between the floor and the piece of furniture.

2. The device as defined in claim 1 wherein said outwardly extending member comprises a strip of resilient material adapted to hook onto the piece of furniture to maintain the protective frame in a substantially upright position.

3. The device as defined in claim 1 wherein said outwardly extending member includes means for increasing the size of said member.

4. The device as defined in claim 1 wherein said outwardly extending member comprises a strip of resilient material having a substantially U-shape which includes a first side portion which is adapted to contact and extend partially along the floor and a second side portion which is adapted to contact a structural portion of the piece of furniture, wherein the resiliency of the U-shaped strip of material creates a biasing force which causes the protective frame to be maintained in a substantially upright position.

5. The device as defined in claim 1 further including means for pivotally attaching said outwardly extending member to said protective frame.

6. The device as defined in claim 5 further including spring means associated with said means for pivotally attaching said outwardly extending member to said protective frame.

7. A scratching device for protecting a piece of furniture from being scratched by a pet, comprising:

a substantially rigid protective frame for covering at least a portion of the piece of furniture when placed in close proximity thereto, wherein said protective frame includes a surface into which a pet may sink its claws;

a resilient outwardly extending member connected to said protective frame for holding said protective frame in a substantially upright fashion and in close proximity to the piece of furniture, said outwardly extending member having a first side portion adapted to contact and extend partially along the floor and a second side portion adapted to contact a structural portion of the piece of furniture, wherein the resiliency of said resilient member causes the protective frame to be maintained in a substantially upright position.

8. The device as defined in claim 7 wherein the resilient outwardly extending member has a substantially U-shaped structure.

9. The device as defined in claim 7 wherein the resilient outwardly extending member has a substantially U-shaped structure which includes an outer end adapted to contact one side of a structural portion of the piece of furniture while the protective frame remains abutted against the opposite side of the structural portion of the piece of furniture, the resiliency of the outwardly extending member providing a biasing force which maintains the protective frame in a substantially upright position.

10. The device as defined in claim 7 wherein said first side portion of said resilient outwardly extending member extends at an angle less than 90 degrees relative to said protective frame.

11. The device as defined in claim 7 wherein said resilient outwardly extending member has a substantially V-shaped structure.

12. A scratching device for protecting a piece of furniture from being scratched by pet, comprising:

a substantially rigid protective frame for covering at least a portion of the piece of furniture when placed in close proximity thereto, wherein said protective frame includes a surface into which a pet may sink its claws;

a composite holding means connected to said protective frame for holding said protective frame in a substantially upright position and in close proximity to the piece of furniture, said holding means including an outwardly extending member adapted to be placed in contact with the floor and a structural part of the piece of furniture for maintaining the protective frame in a substantially upright position and a resilient outwardly extending member connected to said protective frame for holding said protective frame in a substantially upright position and in close proximity to the piece of furniture.

13. The device as defined in claim 12 wherein said resilient outwardly extending member has a first side portion adapted to contact and extend partially along the floor and a second side portion adapted to contact the structural portion of the piece of furniture, wherein the resiliency of the resilient member creates a biasing force which causes said protective frame to be maintained in a substantially upright position.

14. The device as defined in claim 13 wherein said resilient outwardly extending member extends at an angle less than 90 degrees relative to said protective frame.

15. The device as defined in claim 12 wherein said resilient outwardly extending member has a substantially U-shaped structure.

16. The device as defined in claim 12 wherein the resilient outwardly extending member has a substantially U-shaped structure having an outer end which contacts one side of a structural portion of a piece of furniture while the protective frame remains abutted against the opposite side of the structural portion of the piece of furniture, the resiliency of the outwardly extending member providing a biasing force which maintains the protective frame in a substantially upright position.

17. The device as defined in claim 12 wherein said outwardly extending member extends substantially perpendicular relative to said protective frame.

18. The device as defined in claim 12 wherein said outwardly extending member extends at an angle less than 90 degrees relative to said protective frame.

19. The device as defined in claim 12 wherein said outwardly extending member and said resilient outwardly extending member extend from said protective frame in a relatively side-by-side arrangement.

20. The device as defined in claim 12 wherein said resilient outwardly extending member has a substantially V-shaped structure.

* * * * *